Dec. 15, 1931.   J. A. GEHRUNG   1,836,319
MOTOR RELEASING SYSTEM FOR AEROPLANES
Original Filed Aug. 10, 1922    5 Sheets-Sheet 1

Inventor
Julien A. Gehrung
his Attorney

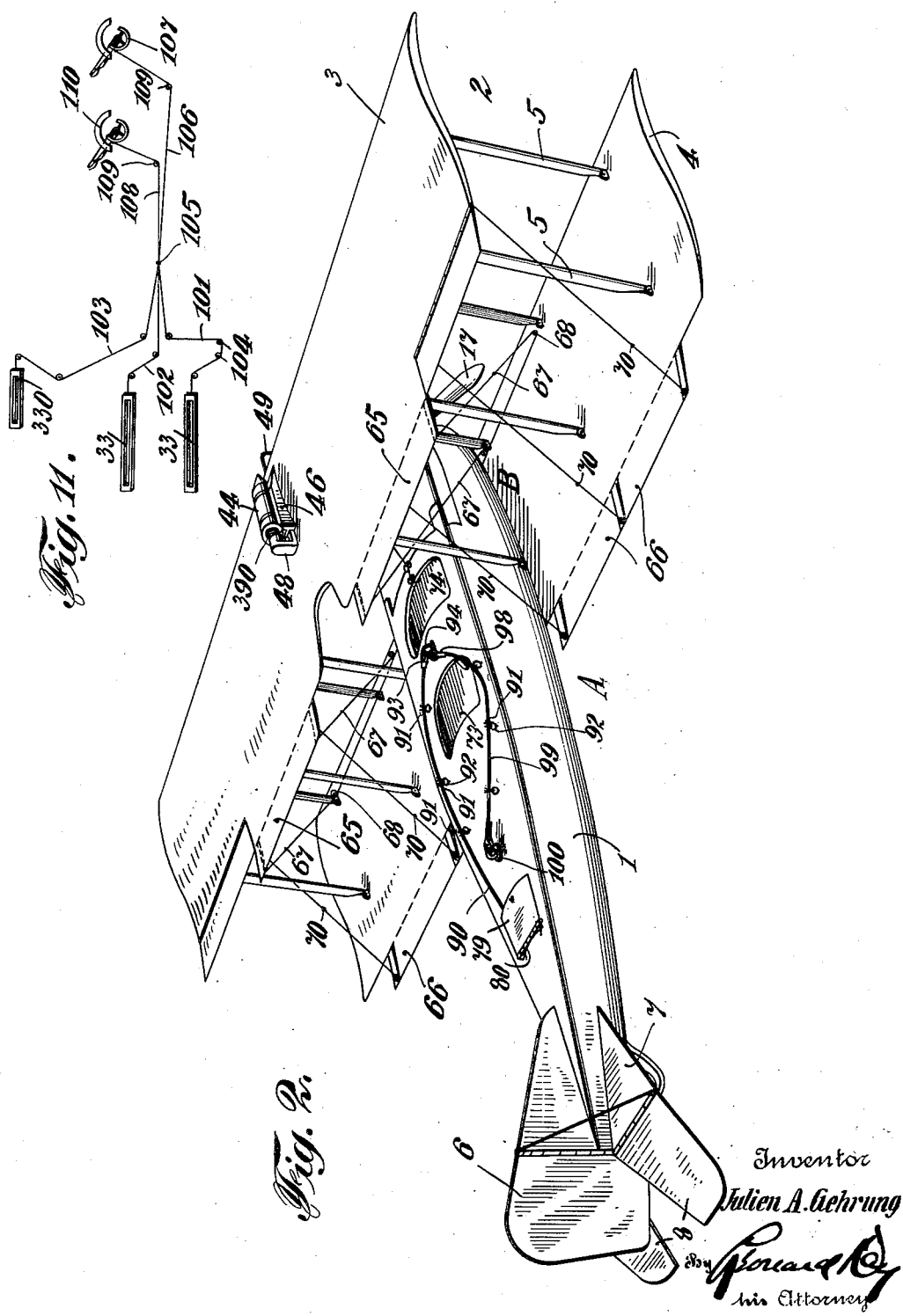

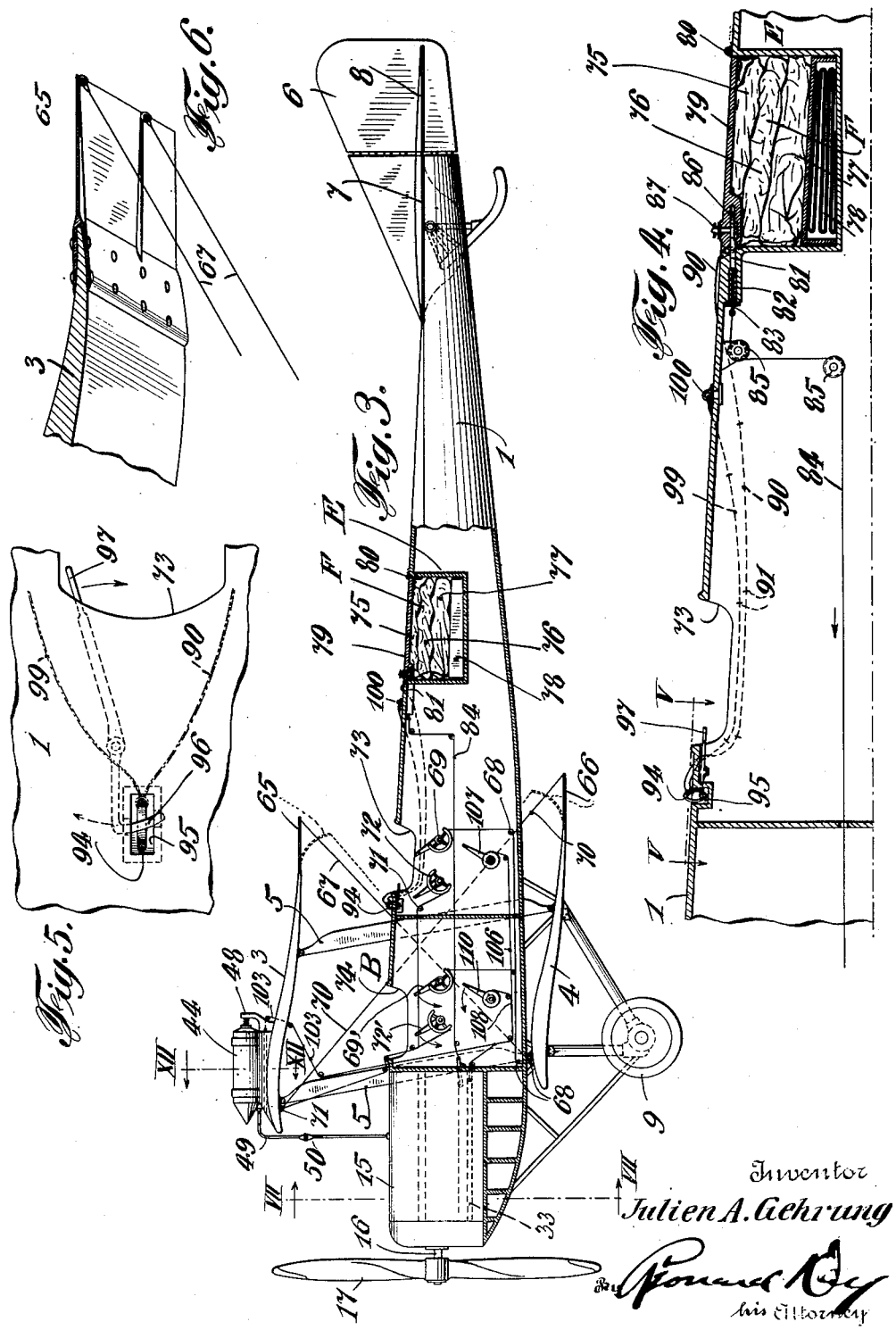

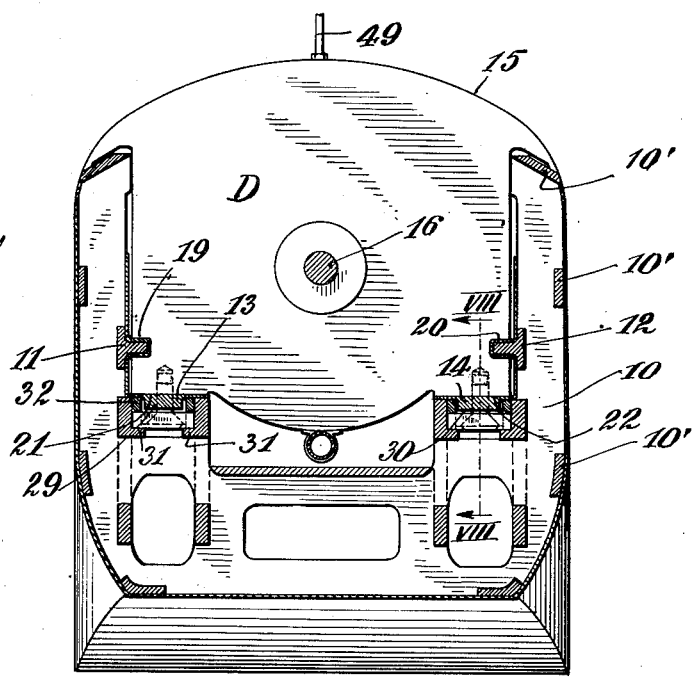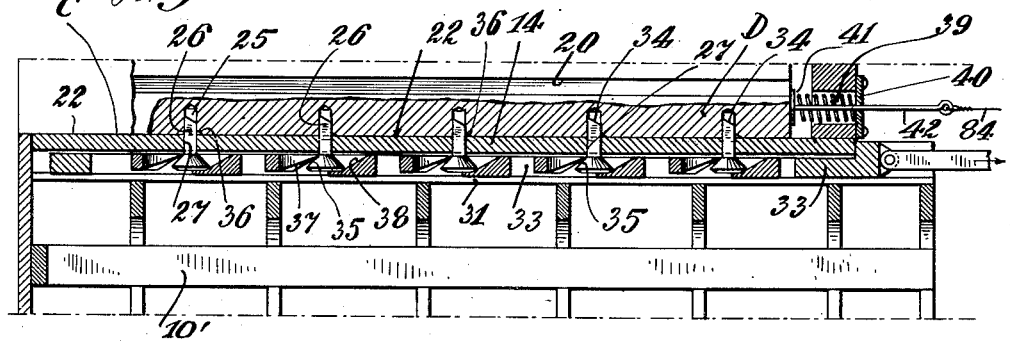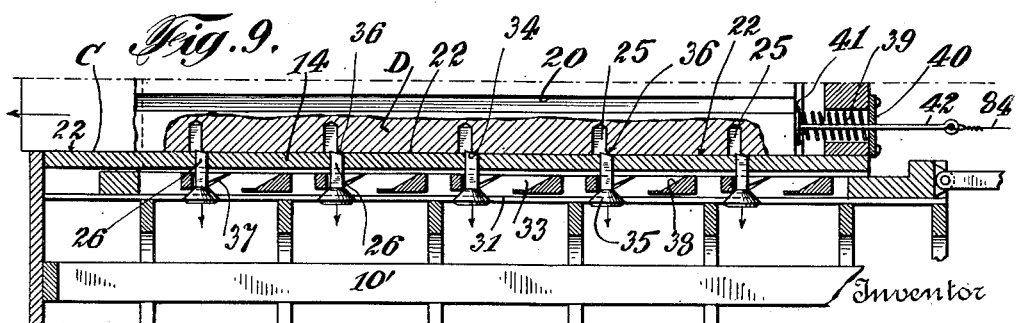

Dec. 15, 1931.   J. A. GEHRUNG   1,836,319
MOTOR RELEASING SYSTEM FOR AEROPLANES
Original Filed Aug. 10, 1922    5 Sheets-Sheet 5
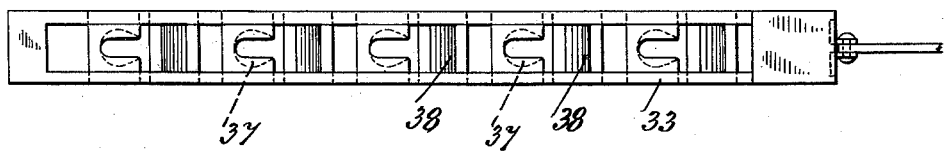
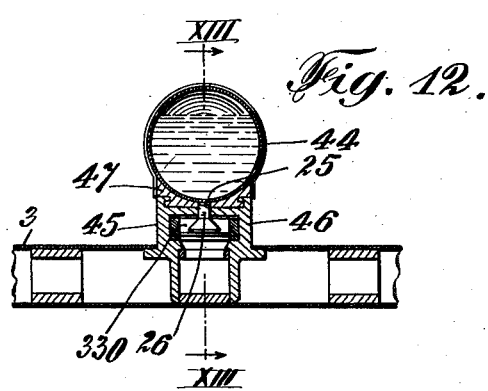
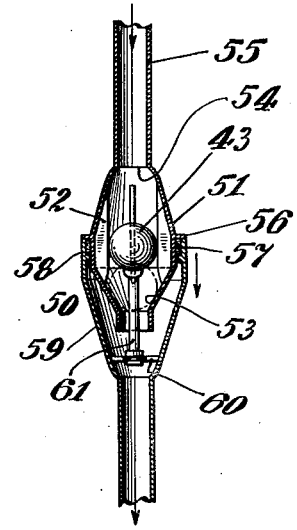
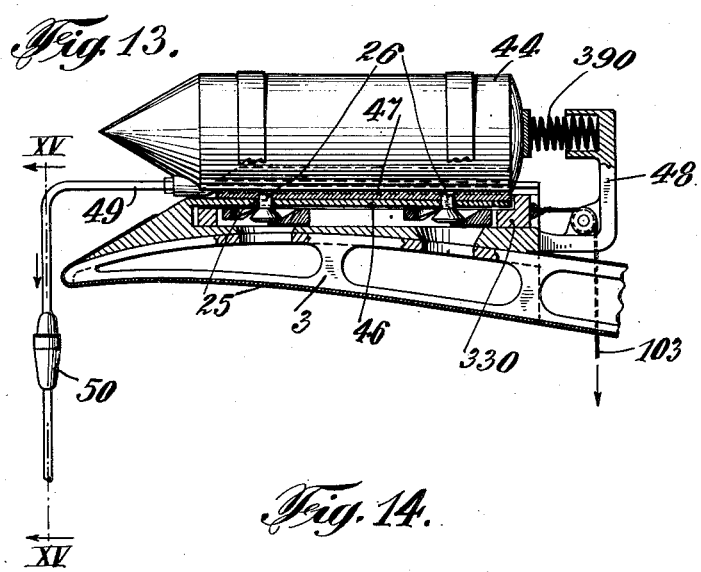
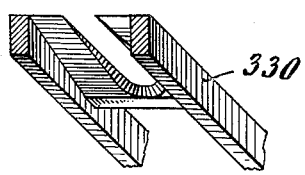
Inventor
Julien A. Gehrung
his Attorney Patented Dec. 15, 1931

1,836,319

UNITED STATES PATENT OFFICE

JULIEN A. GEHRUNG, OF NEW YORK, N. Y.

MOTOR RELEASING SYSTEM FOR AEROPLANES

Application filed August 10, 1922, Serial No. 580,854. Renewed April 15, 1927.

This invention relates primarily to safety provisions in the construction of aeroplanes and their embodiment is set forth in connection with the tractor-type of biplane. In a flying machine of this character, the main part of the ship is a combination structure embodying a fuselage and an aeroplane cell, it being understood that for the purposes of this invention the aeroplane cell may be a monoplane or several planes, although it is preferably in the form of a biplane. The usual adjuncts to this combination structure such as rudder, stabilizer, running gear and controls are of course contemplated.

As is well known, the sustaining force of an airship of this character is provided by the tractive effort of the power plant usually exerted through a forwardly positioned propeller driven by a forwardly mounted engine. The dangerous nose dive usually following whenever an engine goes dead heretofore has almost inevitably resulted in the total destruction of the ship and the death of its pilot and passengers. With a dead engine it is the power plant and fuel tank which are most actively responsive to gravitation to cause the rapid descent in a nose dive. I propose, not as heretofore, merely to save the pilot and passengers by independent means such as a parachute in such an event, but to employ the entire combination structure of the air ship to this end, preferably by first discharging the power plant and the fuel tank from the fore-part of the airship when it is actually in a nose dive and preferably under the urge of means exerting a discharging force, and then to right the ship out of the nose dive by the reaction of a released parachute first exerting its force upon a point of attachment well forward and then shifting operative point of attachment of the parachute aftwardly utilizing the aeroplane cell as a glider in combination with the shifted lifting force of the parachute.

Preferably I provide means for supplying a retarding force to effect the discharge of said power plant and fuel tank under the urge of gravity by the provision of ailerons on each parallel pair of planes, together with means to cause these ailerons to converge and choke the passage of air between the said pair of planes so that, upon the descent of the ship in a nose dive, a great air resistance for the aforementioned combination structure may be effected so that the pull of gravity on the power plant and fuel tank may be effective relatively to said combination structure in effecting the discharge or freeing of the same when suitable releasing mechanism is operated. To this general end I also contemplate the provision of means for effecting the application of force reacting between said combination structure and said power plant and between said combination structure and said fuel tank which may be in the form of a spring normally held under compression to become active upon the release of either of these units.

Further objects of my invention are to provide suitable controls operating and actuating connections for operating the aforementioned means and effecting individually and collectively the aforementioned functions. It is further an object of my invention to improve in general upon airship construction with a view to safeguarding the aforementioned combination structure as well as its human occupants.

In connection with the general scheme of my invention, it is noteworthy that the greatest damage to such a ship on its contact with the earth after a fall is caused by the great weight of the power plant reacting upon the rest of the structure, while the power plant itself constitutes only a fraction of the cost of the entire ship and may well be sacrificed when its discharge is sufficient to save the remainder. It is not inevitable, furthermore, that the discharged power plant be totally destroyed upon falling to the earth.

The above and further objects of the invention will better be understood by reference to the illustrative embodiment thereof described in the following specification in connection with the accompanying drawings which form a part hereof, and in which like characters designate corresponding parts in the several figures. The claims are directed to such embodiment merely for purposes of illustration and not limitation. In the drawings Fig. 1 is a diagram illustrating five stages in my complete invention functioning with an airship operating with a dead engine and having commenced a nose dive;

Fig. 2 is a diagrammatic perspective view of a ship embodying my invention;

Fig. 3 is a side elevaton thereof, parts being shown in longitudinal section;

Fig. 4 is a fractional longitudinal section drawn to an enlarged scale;

Fig. 5 is a fractional top plan view indicating the mechanism for shifting the point of application of the parachute;

Fig. 6 is a fractional, perspective section of the aileron or wing flap construction;

Fig. 7 is an enlarged section through the plane of line VII—VII of Fig. 3 with the propeller removed and part shown in end elevation;

Fig. 8 is a fractional longitudinal section in the direction of the arrows through the plane of line VIII—VIII of Fig. 7;

Fig. 9 is a view similar to Fig. 8 showing the securing means for the engine released and the engine in the process of sliding out of its bed;

Fig. 10 is a detail plan view of the slide cam;

Fig. 11 is a diagrammatic representation of the slide cams, two for the engine and one for the fuel tank, together with their controls and connections;

Fig. 12 is a section through the plane of line XII—XII of Fig. 3 looking in the direction of the arrows and drawn to an enlarged scale;

Fig. 13 is a side elevation of the fuel tank and its mounting, parts being shown in longitudinal section;

Fig. 14 is a perspective view in fractional view of a slide cam; and

Fig. 15 is a detail section drawn to an enlarged scale of the slip coupling and valve for the fuel duct taken along the plane of line XV—XV of Fig. 13.

Figure 1:
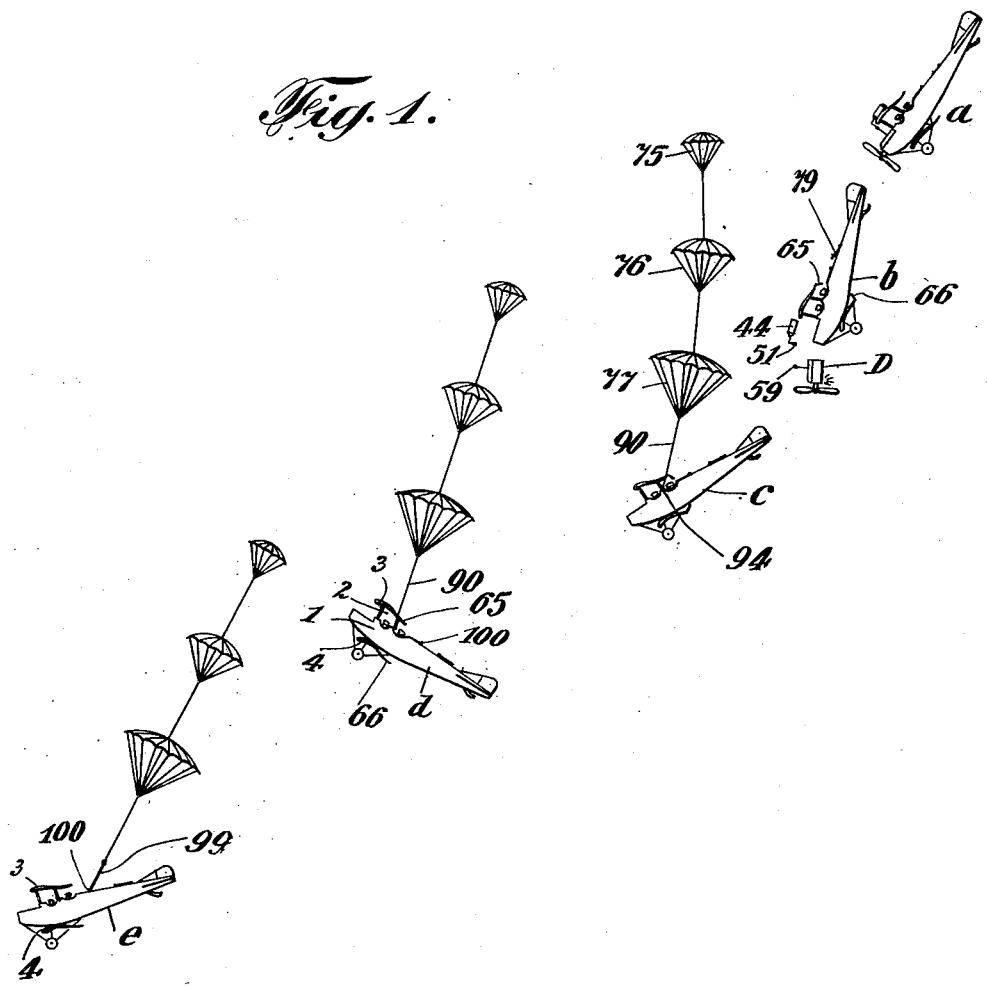

It is to be understood that the airship A, shown comprising the fuselage 1 combined with the aeroplane cell 2 in the form of two parallel planes 3 and 4, should comprise all the necessary adjuncts to complete the type of commercial structure desired. For example, usual struts 5, rudder 6, stabilizer 7, elevator 8 and running gear 9 are indicated. The ship construction itself, as contra-distinguished from power plant and fuel-tank and comprising principally the fuselage and the aeroplane cell, is designated as B.

Built and framed in as part of the fuselage construction and shown mounted in yokes 10 which are themselves suitably framed upon the fore and aft beaming 10' of the fuselage is the power-plant bed C which comprises fore and aft slideways 11, 12, 13 and 14. The power-plant D is formed with a protecting hood 15 secured directly to the engine without any attachment other than sliding engagement with the fuselage so that it is removable with the power-plant as an entirety. The propeller shaft 16 projects forwardly through the hood 15 and carries the usual propeller 17.

The main castings of the power plant D are machined to provide slip-ways or cooperating formations to engage the slideways 11, 12, 13 and 14, preventing all transverse movement both laterally and up and down for the power-plant relatively to the fuselage. Thus longitudinal slots 19 and 20 seat the slideways 11 and 12, while slip faces 21 and 22 on the under side of the power-plant cooperate with the slideways 13 and 14.

Mid-positioned in each of the slip-ways 21 and 22 and spaced at intervals fore and aft are sockets 25 extending into the casting of the power-plant. These sockets normally seat locking studs 26 passing through guiding perforations 27 in the ribs 29 and 30 included in the slideway construction which forms channels between flanges 31 and retaining strips 32 for the operative guidance of the slide cam 33, one for each slideway 13 and 14. Each of the studs 26 has a bevelled upper end 34 and a double frusto-conical shaped head 35 at its lower end. The bevelled ends 34 serve to insure the forward release of the power-plant D which is also facilitated by the provision of inclines or bevels 36 at the rear of each socket 25 above the slide faces 21 and 22. Coöperating with the heads 35 are double pairs of cams 37 and 38, one double pair for each stud 26.

A retractile or aftward movement in the direction of the arrow in Fig. 8 of the cam slide 33 into the position shown in Fig. 9 causes each pair of cams 37 to drag down in the direction of the vertical arrows, each locking stud 26 to clear the sockets 25. These studs 26 constitute the sole aft to foreward locking means for the power-plant and when removed, as indicated in Fig. 9, permit the forward discharge of the power-plant. Compression springs 39, one for each side of the power-plant, react between the retainer plate 40 secured to the fuselage frame and the disk 41 resting against the rear of the power-plant. The stem 42 guided through a perforation in the retainer plate 40 and fixed at its forward end to the disk 41 may serve normally to resist the expansion of spring 39 for a purpose later to be described.

Mid-positioned on the upper plane 3 in fore and aft slideways 45 and 46 is a fuel-tank 44 which may be strapped to a slip base 47 slidably interlocking with the slideways 45 and 46 and provided with sockets 25 into which pass studs 26 operated by a slide cam 330 similar to the slide cam 33 for the power-plant construction. A compression spring 390 may be provided reacting between the bracket 48 framed to the upper plane and the rear of the fuel-tank 44 to exert a force tending to discharge the fuel-tank when it is released by the retaining studs 26. The fuel conduit 49 from the fuel-tank 44 and extending to the power-plant D is preferably provided with a slip connection 50 automatically severable in the event that either the power-plant or the fuel tank is discharged, the one before the other.

The coupling 50 comprises a bulbous enlargement 51 internally fitted with guide-ribs 52 guiding the valve ball 43 of fibre or other suitable material between the seats 53 and 54, the latter at the end of the pipe 55. Against the flange 56 and about the mid-portion of the bulbous enlargement 51 is a packing 57 forming a fluid tight joint with the flange 58 of the opposing coupling member 59. In this member a spider 60 supports an outwardly projecting stem 61 normally holding the ball 43 out of contact with the seat 53, into closing engagement with which it is immediately forced by gravity or the flow of fuel upon the parting of the two parts, 51 and 59, of the coupling. This provision insures the free discharge, one ahead of the other, of either the power-plant or the fuel-tank and the checking of an undesired flow of fuel which might cause a conflagration, one of the greatest dangers to be encountered.

Although springs tending to discharge both the power-plant and the fuel-tank have been illustrated and described it is contemplated that such forces as springs are capable of exerting may be inadequate. Additional means capable of exerting a greater discharging force for the power-plant and fuel-tank from the aforementioned combination structure is provided. This means is shown in the form of ailerons or flexible flaps 65 and 66 respectively for the top and bottom planes 3 and 4 together with means for positively causing these ailerons to converge so as to choke the air passage between the planes aftwardly of the structure. Cords 67 passing about pulleys 68 and extending to a suitable control 69 operate the flap 65, while similar cords 70 guided by suitable pulleys 71 may be operated by a control 72, or, if desired, by the control 69 operating the aileron construction 65 although, for some purposes, it is preferable that the control of the ailerons be independent one of the other. It is, of course, to be understood that this choking control of the ailerons, 65 and 66 is independent of their functioning for any other purposes than that of retarding the descent of the combination structure in a nose dive to facilitate the release of the power-plant and fuel-tank under the pull of gravity.

The controls 69 and 72 are provided for the pilot's cockpit 73, but it is to be understood that a corresponding additional pair of similar controls 69' and 72' may be provided for the observer's cockpit 74 to operate the same cords and corresponding ailerons as do the controls 69 and 72 and in the same manner.

A parachute container E of general jack-in-the-box construction is built into the fuselage to house a parachute structure F preferably comprising three tandem connected units of graded sizes 75, 76 and 77, the smallest on top, normally urged upwardly and outwardly by the spring expansion seat 78 against the action of which the parachute construction is retained by the trap 79 secured by the spring opening hinge 80 to the fuselage and normally held closed by the spring shot latch bolt 81, through the compression spring 82 through which extends the stem 83 forming an extension from the bolt 81 and connected to the cord 84 working over suitable pulleys 85 and extending under tension forwardly to the rear eye of the stem 42 under the control of the heavy compression spring 39. Upon the discharge of the power-plant D spring 39 expands to overcome the spring 82 and retract the latch bolt 81 so that the trap door 79 automatically flies open to effect the discharge of the parachute. For the purpose of opening the trap door 79 manually a cam 86 operated by the turn bolt 87 may be provided to force back the nose of the bolt 81. The draw rope 90 from the parachute structure F extends out of the compartment E between the forward lip of the trap door 79 and the cowl of the fuselage, the opening preferably being packed by oakum or other suitable waterproofing material.

The rope 90 extends forwardly over the cowl of the fuselage to which it may be lightly lashed by fragile cord 91 taking into eyes 92 to drape it conveniently about the cockpit 73. At its forward end it is secured preferably by a suitable eye 93 to a ring 94. The ring 94 projects into a waterproof recess 95 in which it is secured by the releasable nose 96 of the lever 97, which nose serves as the fore or initial point of attachment for the parachute rope and is located preferably in the median vertical plane of the structure which corresponds with and is the plane passing through both the center of gravity and the center of resistance of the entire airship. It is desirable that these centers, besides being located in this plane, be located both above and forward of the center of gravity. Also attached to the ring 94 in any suitable manner as by an eye 98 is a short length of rope 99 similar to and lashed in a similar manner by fragile string 91 taking into eyes 92 as in rope 90. The opposite end of this rope 99 is attached in a suitable manner to an anchorage 100 likewise positioned in the vertical plane of the center of gravity and center of resistance of the structure, but well aftwardly of the point of attachment 94 and aft of the center of gravity, engine discharged.

It is preferred that all the slide cams 33 for the power-plant and 330 for the fuel-tank be provided with retractile cords such as 101, 102 and 103 taking over suitable pulleys 104 suitably positioned and connected to a common point of mutual attachment 105 from which a common operating cord 106 extends to a control 107 for cockpit 73 and a cord 108 extends to a control 110 for cockpit 74, suitable direction changing pulleys 109 being provided when necessary for the operating cords as they pass through the fuselage in positions out of the way of both pilot and observer.

Operation

In the diagram of Fig. 1, a indicates the airship entering into a nose dive when the engine has gone dead. It is then the duty of the pilot to operate control 107 to retract all the slide cams, which frees the power-plant and the fuel-tank from any positive connection with the combination structure of the airship. It is well, immediately after the operation of this control, to effect an immediate retardation of the ship. This is effected by operating simultaneously both the controls 69 and 72 and converging the ailerons 65 and 66. The ship at this stage of the dive is indicated by b, when both the power-plant and the fuel-tank have been discharged and are dropping clear and ahead of the ship.

The next operation to effect a safe landing is automatic. The discharge of the power plant opens the trap door 79, the smallest parachute unit 75 emerges and after opening drags out the remaining units 76 and 77, which exert a strong upward pull upon the fore point of attachment 94, 96, tending to jerk up the nose of the ship. The commencement of this operation is shown by the c diagram, while its completion is indicated by diagram d. Although an upward jerk by the rope 90 of the parachute is required to be well forward to pull the ship out of the nose dive, however, a long continuation of the retractile force of the parachute at this forward point is not desired because of the fact that the center of gravity has been automatically shifted aftwardly upon the discharge of the power-plant and the fuel-tank. It is the pilot's duty, therefore, to operate the lever 97 to release the ring 94 as soon as the position for the ship indicated by d has been accomplished. The point of application of the retractile force of the parachute is then shifted aftwardly through the rope 99 to the point of attachment 100 where it combines well with the lifting effect of the planes 3 and 4 in effecting a safe volplane to the earth. (See Diagram e.)

Immediately after the release of the parachute the converging of the ailerons 65 and 66 should usually be eliminated by a reverse operation of the controls 69 and 72, the planes 3 and 4 resuming their normal contour and functioning as gliders, as indicated in Diagrams d and e.

The inventive thought may have a variety of expressions, as is contemplated in what I claim and desire to secure by United States Letters Patent as follows:—

1. In an aeroplane construction in combination, a fuselage; an aeroplane cell permanently secured to said fuselage; a power-plant detachably secured to said fuselage; means for exerting a downward discharging force upon said power-plant relatively to said fuselage; and means for detaching said power-plant from said fuselage.

2. In an aeroplane construction a combination structure comprising a fuselage and an aeroplane cell; a power-plant and a fuel-tank individually mounted upon said combination structure and one of which is detachable and dischargeable from said combination structure; a fuel conduit connecting said power-plant with said fuel-tank and being provided with a detachable severance coupling and a valve to stop the flow of fuel from said tank when a severance between said power-plant and said fuel-tank is effected by a discharge of one or the other.

3. In an aeroplane construction a combination structure comprising a fuselage and an aeroplane cell; means for choking the air passage through said aeroplane cell; a parachute normally inclosed in said combination structure and having an operative attachment thereto at a point above its center of gravity; and means for discharging said parachute from said combination structure to operate directly thereon to resist its fall.

4. In an aeroplane construction a combination structure comprising a fuselage and an aeroplane cell; a parachute having an operative attachment to said combination structure; releasable means for normally confining said parachute in said combination structure; and means for effecting an aftward shift of the point of application on said combination structure of the resisting force of said parachute while it is in operation.

5. In an aeroplane construction, a combination structure comprising a fuselage and an aeroplane cell; a power-plant provided in said combination structure and having a fore and aft slideway to mount said power plant securely against all transverse movement relatively to said combination structure but permitting a forward movement thereof relatively to said structure; and releasable means normally locking said power-plant against fore and aft movement in said guideway.

6. The structure defined in claim 5 and further characterized by the fact that means is provided for exerting a downward discharging force upon said power-plant relatively to said combination structure.

7. The structure as described in claim 5 and further characterized by the fact that a fuel-tank is releasably carried by said combination structure and means is provided for detaching said tank from said structure.

8. In combination in an aeroplane construction, a combination structure including a fuselage and an attached biplane, each plane being fitted with an aileron construction; means for causing said aileron constructions to converge to choke the air passage between said planes and exert a parachutic effect; a forwardly positioned power-plant; and means for detaching said power-plant from said combination structure to effect its discharge by the retardation of said combination structure.

9. The aeroplane construction described in claim 8 and further characterized by the fact that a parachute is combined with said combination structure having a point of attachment tending to right the same when nose-diving.

10. In combination in an aeroplane construction, a combination structure including a fuselage and an attached biplane, each plane being fitted with an aileron construction; means for causing said aileron constructions to converge to choke the air passage between said planes and exert a parachutic effect; a forwardly positioned power plant; means for detaching said power plant from said combination structure to effect its discharge by the retardation of said combination structure; a parachute in operative combination with said combination structure, having a point of attachment tending to right the same when nose-diving; and means for shifting aftwardly the point of attachment of said parachute while said parachute is in operation exerting a retarding force upon said combination structure.

11. In an aeronautical vehicle, a motor and fuel tank therefor, and means in combination therewith for discharging said tank and motor from said vehicle.

12. In an aeronautical vehicle, a motor and fuel tank therefor, and means in combination therewith for discharging said motor from said vehicle, fuel connection between said tank and motor, means for severing said connection and for preventing the flow of fuel after said severance.

13. In an aeronautical vehicle, a motor and fuel tank therefor, and means in combination therewith for discharging said motor from said vehicle in the direction of the line of flight of the same, fuel connection between said tank and motor, means for severing said connection and for preventing the flow of fuel after said severance, and means for placing said vehicle in gliding position after said motor has been discharged.

14. In an aeronautical vehicle, a motor and fuel tank therefor, means for discharging the same from said vehicle, a parachute secured to said vehicle in such manner that the releasing of said parachute will maintain said vehicle in gliding position after said discharge.

15. In an aeronautical vehicle, a motor and fuel tank therefor, means for discharging the same from said vehicle, a parachute secured to said vehicle in such manner that the releasing of said parachute will shift said vehicle to gliding position after said discharge.

16. In combination with an aeroplane having releasable equipment, a parachute adapted to be released for giving support to said vehicle, said parachute anchored to said vehicle at points aft of the normal center of gravity so that when the equipment has been discharged said parachute first exerts a lifting effect upon said vehicle at a point aft of the normal center of gravity and forward of the new center of gravity established by the release of said equipment, and then exerts its final pull or lift from a point aft of the new center of gravity, thereby preventing nose dive, and finally suspending said vehicle in position for gliding operation.

17. In combination with an aeroplane, a parachute, and means for anchoring the same thereto and for discharging the same therefrom, and in combination with said machine, means for discharging equipment therefrom, and in combination therewith means for retarding the flight of said machine while said equipment is being discharged.

18. In combination with an aeroplane, a parachute, and means for anchoring the same thereto and for discharging the same therefrom, and in combination with said machine, means for discharging equipment therefrom, and in combination therewith means for retarding the flight of said machine independently of the action of said parachute when said machine is in a nose dive.

In witness whereof I have signed my name to this specification this 8th day of August, 1922.

JULIEN A. GEHRUNG.